A. P. POWERS.
Grain-Dropper.

No. 210,355. Patented Nov. 26, 1878.

UNITED STATES PATENT OFFICE.

ABNER P. POWERS, OF FLOWERY BRANCH, ASSIGNOR OF ONE-HALF HIS RIGHT TO JOHN H. POWERS, OF COCHRAN, GEORGIA.

IMPROVEMENT IN GRAIN-DROPPERS.

Specification forming part of Letters Patent No. 210,355, dated November 26, 1878; application filed September 12, 1878.

*To all whom it may concern:*

Be it known that I, ABNER P. POWERS, of Flowery Branch, in the county of Hall, and in the State of Georgia, have invented certain new and useful Improvements in Grain-Droppers; and do hereby declare that the following is a full, clear, and exact description thereof, reference being had to the accompanying drawings, and to the letters of reference marked thereon, making a part of this specification.

The nature of my invention consists in the construction and arrangement of a planter for planting corn, pease, or other seed that are planted in hills, as will be hereinafter more fully set forth.

In order to enable others skilled in the art to which my invention appertains to make and use the same, I will now proceed to describe its construction and operation, referring to the annexed drawings, in which—

Figure 1:
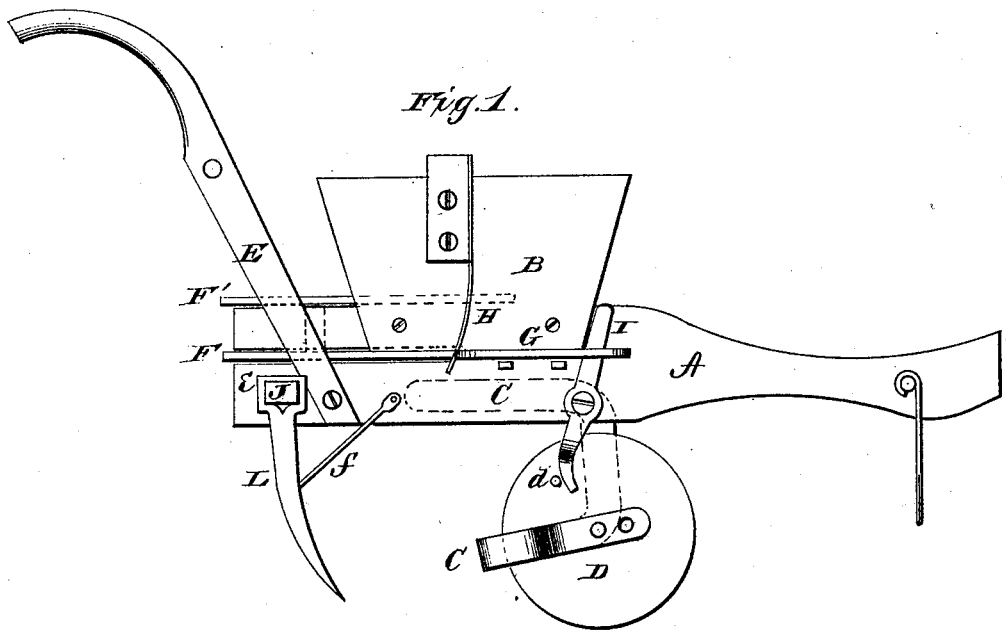
Figure 2:
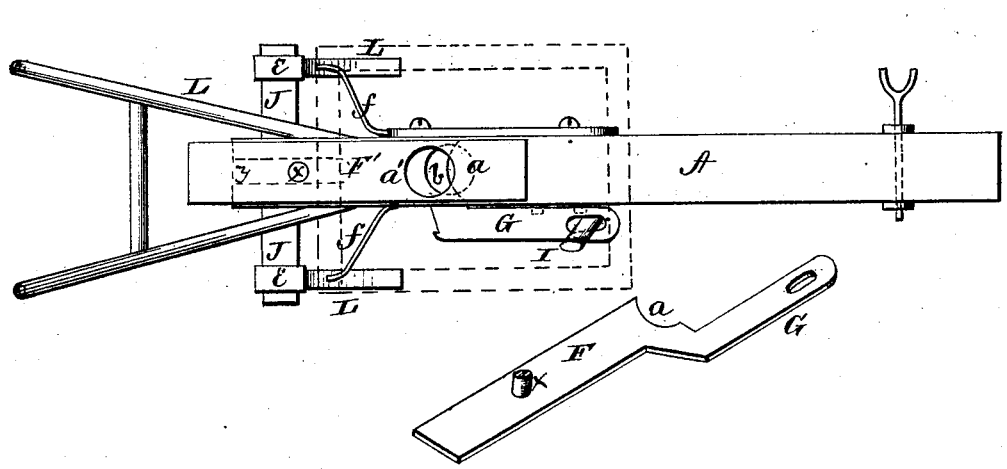

Figure 1 is a side elevation of my planter. Fig. 2 is a plan view of the same.

A represents a single beam, of any suitable dimensions, on which is secured the hopper B. E E are handles, secured to the beam. On one side of the beam A is fastened an iron bar, C, the front portion of which is bent downward for a suitable distance, then extends toward the rear, and then bent around and forward again, forming a loop or frame, in which is mounted a wheel, D.

The loop or rear portion of the frame acts as a scraper or cleaner to keep the periphery of the wheel free from dirt.

The beam A is slit horizontally from the rear end forward for a suitable distance, and in this slit is placed a sheet-metal slide, F, and on top of the beam is a similar slide, F'. These two slides are connected by means of a pin or rivet, x, so as to be moved simultaneously by devices hereinafter described, said pin or rivet passing through a vertical slot, y, in the rear end of that portion of the beam which is above the horizontal slot for the lower slide, F.

The two slides F F' are provided, respectively, with seed-openings a a', corresponding with a vertical opening, b, through the beam A. The openings a a' in the two slides are so arranged that when the slides are moved forward the opening a' of the upper slide, F', will coincide with the opening b, while the opening a of the lower slide will be in front of the opening b, and hence a certain quantity of seed will drop down and lodge upon the slide F. When the slides then are moved backward, the upper slide, F', will cut off the seed, and the lower slide, F, will permit the seed that had lodged thereon to pass out.

The lower slide, F, has on one side an arm, G, in a slot in which is inserted the upper end of a lever, I, pivoted to the side of the beam. The lower end of this lever is curved inward, so as to be operated by a pin, d, projecting from the side of the wheel D. As the wheel revolves this pin turns the lever I so to move the slides F F' rearward, and as soon as said pin clears the end of the lever a spring, H, throws the slides forward again.

Through a horizontal mortise in the rear end of the beam A is passed a bar, J, and firmly fastened by keys or otherwise. On each end of this bar is placed a foot, L, to receive a covering-shovel.

The upper end of each foot L forms a square loop or socket, e, so that the foot can easily be moved out or in on the bar, so as to cause them to run closer together or farther apart. They are held by braces f, as shown.

A suitable plow or furrow-opener will be connected at the front end of the beam.

Any number of pins d may be used in the wheel D, according to the distance desired between the hills.

Having thus fully described my invention, what I claim as new, and desire to secure by Letters Patent, is—

The combination of the beam A, provided with a horizontal slot, as described, and a vertical slot, y, in the top portion, the lower slide, F, provided with the projecting side arm G and seed-opening a, the upper slide, F', provided with seed-opening a', and connected with the lower slide by the pin or stud x, the lever I, and wheel D, with pin d, all constructed substantially as and for the purposes herein set forth.

In testimony that I claim the foregoing I have hereunto set my hand this 5th day of August, 1878.

A. P. POWERS.

Witnesses:
H. H. BORING,
F. T. DAVIS.